(12) United States Patent
Nakamura et al.

(10) Patent No.: US 8,690,990 B2
(45) Date of Patent: Apr. 8, 2014

(54) METHOD OF PURIFYING AIR

(75) Inventors: Morimitsu Nakamura, Kai (JP);
Masato Kawai, Yokohama (JP);
Hiroyuki Takei, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 256 days.

(21) Appl. No.: 13/255,634

(22) PCT Filed: Feb. 25, 2010

(86) PCT No.: PCT/JP2010/001274
§ 371 (c)(1),
(2), (4) Date: Sep. 9, 2011

(87) PCT Pub. No.: WO2010/103739
PCT Pub. Date: Sep. 16, 2010

(65) Prior Publication Data
US 2012/0011887 A1  Jan. 19, 2012

(30) Foreign Application Priority Data
Mar. 11, 2009 (JP) ................................ 2009-058724

(51) Int. Cl.
*B01D 53/04* (2006.01)
(52) U.S. Cl.
USPC ............. 95/97; 95/98; 95/99; 95/106; 95/115
(58) Field of Classification Search
USPC ............... 95/96–99, 104–106, 115, 117, 122, 95/123, 139; 96/132
See application file for complete search history.

(56) References Cited

U.S. PATENT DOCUMENTS

| 3,738,084 A | * | 6/1973 | Simonet et al. | ................. 95/105 |
| 4,233,038 A | * | 11/1980 | Tao | ................................ 95/104 |
| 4,472,178 A | * | 9/1984 | Kumar et al. | ...................... 95/99 |

(Continued)

FOREIGN PATENT DOCUMENTS

| CN | 1282622 A | 2/2001 |
| CN | 1475296 A | 2/2004 |

(Continued)

OTHER PUBLICATIONS

Machine generated English translation of JP 10-15331, published Jan. 1998.*

(Continued)

*Primary Examiner* — Frank Lawrence, Jr.
(74) *Attorney, Agent, or Firm* — Nixon & Vanderhye, P.C.

(57) ABSTRACT

A pre-purification method of feed air for cryogenic air separation, which includes; (a) an adsorption step wherein a compressed feed air is supplied in an adsorption column, wherein a moisture adsorbent and a carbon dioxide adsorbent are filled in this order from the side where the feed air is introduced in the column, to remove water and carbon dioxide from the feed air; (b) a decompression step wherein pressure in the adsorption column is reduced; (c) a heating step wherein the adsorbents in the decompressed column are heated and regenerated, and the heating step includes a total heating step wherein the moisture adsorbent and the carbon dioxide adsorbent are heated and a partial heating step wherein the moisture adsorbent is heated; (d) a cooling step wherein the adsorbents are cooled by introducing a purge gas, which is not heated, to the adsorption column; and (e) a pressurization step wherein the cooled adsorbents are pressurized by purified air.

4 Claims, 1 Drawing Sheet

(56) References Cited

U.S. PATENT DOCUMENTS

| | | | |
|---|---|---|---|
| 5,755,857 A | * | 5/1998 | Acharya et al. ............... 96/122 |
| 5,914,455 A | * | 6/1999 | Jain et al. ..................... 95/96 |
| 6,106,593 A | * | 8/2000 | Golden et al. ................ 95/120 |
| 6,129,780 A | * | 10/2000 | Millet et al. .................. 95/117 |

FOREIGN PATENT DOCUMENTS

| | | |
|---|---|---|
| CN | 1483502 A | 3/2004 |
| JP | 60-139311 | 7/1985 |
| JP | 61-025640 | 2/1986 |
| JP | 10-015331 | 1/1998 |
| JP | 10-057744 | 3/1998 |
| JP | 3416391 | 4/2003 |

OTHER PUBLICATIONS

International Search Report for PCT/JP2010/001274, mailed May 25, 2010.

Office Action and English translation of the Search Report in CN 201080011266.6 dated May 6, 2013.

* cited by examiner

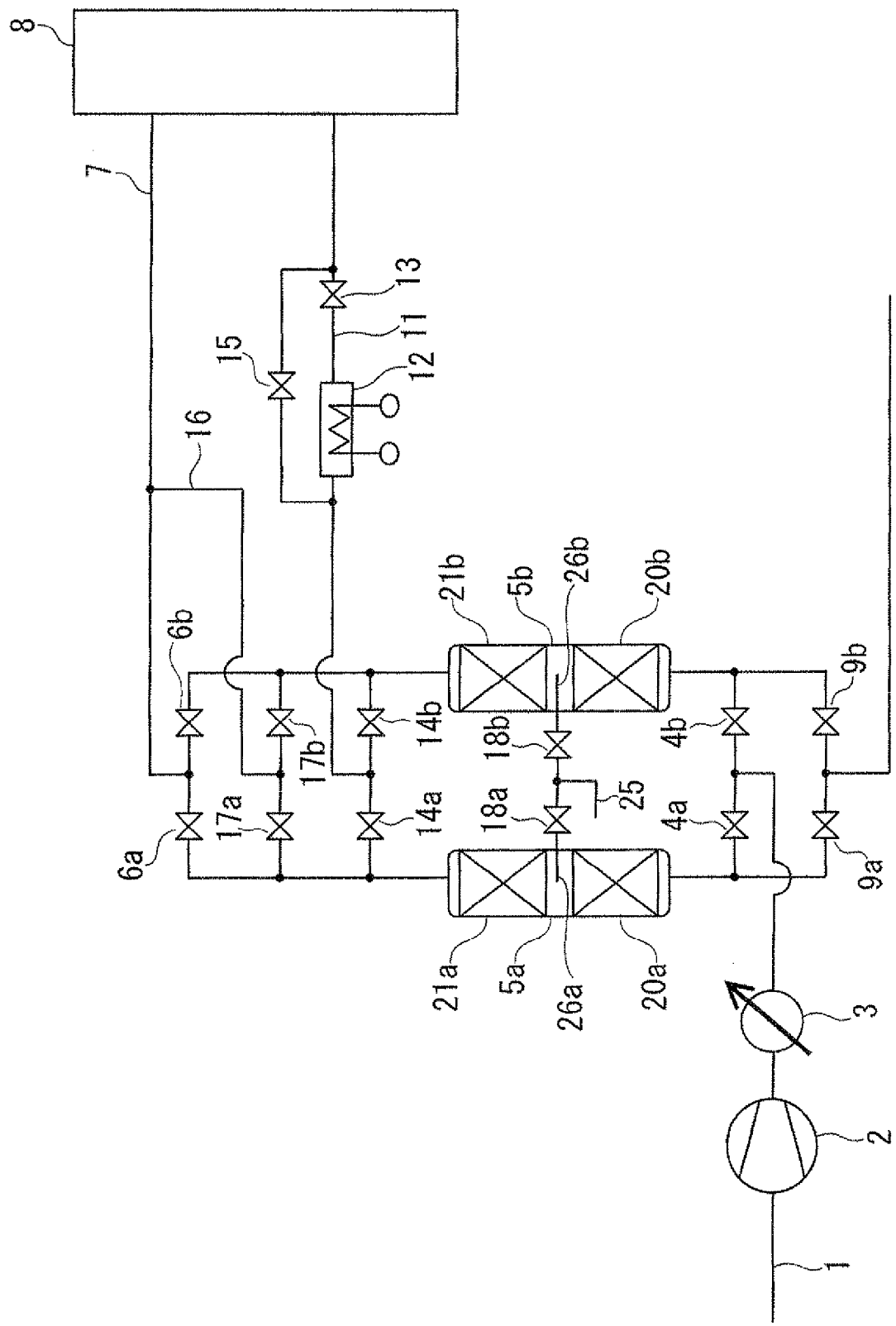

METHOD OF PURIFYING AIR

TECHNICAL FIELD

The present invention relates to a pre-purification method of feed air for cryogenic air separation.

This application is the U.S. national phase of International Application No. PCT/JP2010/001274 filed 25 Feb. 2010 which designated the U.S. and claims priority to JP Patent Application No. 2009-058724 filed 11 Mar. 2009, the entire contents of each of which are hereby incorporated by reference.

BACKGROUND ART

In a cryogenic air separation method wherein nitrogen, oxygen, argon and the like are separated from air by distillation, it is necessary to perform a pre-step wherein water, carbon dioxide, and other trace impurities (hydrocarbons, nitrogen oxide and the like) are removed from feed air in advance before the feed air is cooled at a cryogenic temperature to perform distillation. Said pre-step is called pre-purification of air.

When air which includes said impurities is cooled to a cryogenic temperature as it is, for example, there is a possibility that water, carbon dioxide and nitrogen oxide become solidified and choke piping and the like, or that hydrocarbons concentrate in a liquid oxygen tank and become a factor which inhibits safety operations.

An adsorption method has already been used for pre-purification of a cryogenic air separation method in general.

A temperature swing adsorption method (TSA method) has been used as one of such pre-purification methods wherein adsorption is used. This method is performed with a pre-purification apparatus having plural adsorption columns. In the adsorption columns, an adsorbent (such as activated alumina, silica gel, K-A type zeolite, Na-A type zeolite and the like) is filled to remove water at the inlet side to which feed air enters, and another adsorbent (such as a Na—X type zeolite and the like) is filled at the downstream side of the column to remove carbon dioxide.

The TSA method purifies air in succession with said pre-purification apparatus by alternatively performing an adsorbing step wherein impurities included in feed air are adsorbed by adsorbents at a relatively low temperature, and a regenerating step wherein the adsorbents are regenerated at a relatively high temperature.

A pressure swing adsorption method (PSA method) is cited as another pre-purification method. Similar to the TSA method, this method uses a pre-purification apparatus having plural adsorption columns to perform purification. The PSA method purifies air in succession by alternatively performing an adsorbing step wherein impurities included in feed air are adsorbed by adsorbents at a relatively high pressure, and a regenerating step wherein the adsorbents are regenerated at a relatively low pressure. Similar to the TSA method, in the PSA method, an adsorbent (such as activated alumina, silica gel, K-A type zeolite, Na-A type zeolite and the like) is filled to remove water at the inlet side of an adsorption column where air enters, and another adsorbent (such as a Na—X type zeolite or the like) which selectively removes carbon dioxide is filled at the downstream side of the former adsorbent.

A conventional TSA method generally includes the following steps;

(a) an adsorption step wherein pressurized air is introduced into an adsorption column to remove impurities from the introduced air;

(b) a decompression step wherein the interior of the adsorption column is reduced to atmospheric pressure, after the adsorption step is terminated;

(c) a heating step wherein a purge gas, which does not comprise impurities, is heated and introduced in the adsorption column to perform thermal-regeneration of adsorbents, after the decompression step is terminated;

(d) a cooling step wherein a purge gas, which does not comprise impurities and is not heated, is introduced in the adsorption column to cool the interior of the adsorption column at a temperature wherein the adsorption operation is performable, after the heating step is terminated; and (e) a pressurization step wherein pressurization is performed for the cooled adsorption column by purified air, after the cooling step is terminated.

As described above, adsorbents which are suitable for a component to be adsorbed are used when impurities are removed from air by introducing pressurized air into the adsorption column. Adsorbents have characteristics wherein the adsorption capacity thereof increases at a high operating pressure and at a low operating temperature. Therefore, it is preferable that air to be treated in an adsorption column have a high pressure and a low temperature.

In order to provide such preferred conditions, feed air is conventionally compressed to a predetermined pressure by an air compressor, then cooled to about 40° C. by an after-cooler, and subsequently further cooled to 5 to 15° C. using a refrigerating machine, before feed air is supplied to an adsorption column.

However, an eco-friendly apparatus has been expected in recent years, and therefore, a method has been proposed in Japanese Patent No. 3416391, wherein pre-purification is performed without a refrigerator (freon refrigerator) which uses freon.

Air purification performed under conditions wherein a refrigerating machine is not used has a problem. That is, it is necessary to treat a large amount of water included in air. The higher a temperature is, the larger the amount of saturated water in the air is. Accordingly, when a refrigerating machine is not used and air which is saturated with water is not sufficiently cooled by an after-cooler, a large amount of water enters an adsorption column. Furthermore, due to adsorption heat which is generated when an adsorbent adsorbs water, the entered air is further heated, and another adsorbent which exists at the downstream side is required to absorb carbon dioxide at a high temperature of 60° C. or more.

The invention described in U.S. Pat. No. 3,416,391 solves such unfavorable conditions by the following points (1) to (3).

(1) Decrease of a load by reducing a cycle time (2) Selection of an absorbent which absorbs a large amount of carbon dioxide (3) Optimization of an amount of a regeneration gas and a heating temperature at the time of regeneration Here, in the pre-purification of feed air using the TSA method, a large amount of a purge gas is required in the heating step (c), wherein thermal-regeneration of an adsorbent is performed, and the cooling step (d) wherein the adsorbent is cooled.

As a purge gas, clean air is desirable. In a cryogenic air separation method, a non-product gas (referred to as waste nitrogen or a waste gas) produced in a distillation step, which is performed to generate product gases (nitrogen, oxygen, argon and the like), has been generally used as a purge gas which is used in a cryogenic air separation plant. The reason is that use of such a waste gas enables a decrease in costs as compared with a case wherein air from which impurities such as water, carbon dioxide and the like are removed is produced separately.

The technique according to the invention described in the aforementioned U.S. Pat. No. 3,416,391 enables the regeneration of adsorbents without a cooling step wherein cooling is performed at 5 to 15° C. by a refrigerating machine. In the technique, regeneration of adsorbents can be performed such that a regeneration gas ratio (a regeneration gas ratio=a flow rate of a purge gas used in pre-purification/a flow rate of feed air used in pre-purification) is about 45% at a heating temperature of 200° C., under conditions where air pressure is 700 KPa (Absolute), an air temperature which flows into an adsorption column is 40° C. and a cycle time is 2 hours.

On the other hand, regarding product yield, it has been reported that product yield which can be achieved by the present technical level is about 60%, from the viewpoint of distillation ability of a cryogenic air separation method wherein a single column is used to merely generate nitrogen as a product. Furthermore, regarding a cryogenic air separation method which is a double column process type method and can generate nitrogen and oxygen as products, it has been reported that product yield thereof is about 80%.

However, it should be understood that the aforementioned yields are rough estimates, since product yield in a cryogenic air separation method depends on conditions such as operation pressure and total processes of the cryogenic air separation method.

A regeneration gas ratio of the aforementioned pre-purification method wherein no refrigerating machine is used is 45%. The smaller the regeneration gas ratio is, the larger the manufacturing yield in a cryogenic air separation method is. Pre-purification is an essential step for a cryogenic air separation method. Therefore, the amount of a product, that is, a total amount of a product generated by a cryogenic air separation plant is the remainder, which is obtained by reducing the amount of a regeneration gas required for pre-purification (the amount of a purge gas used for pre-purification) from the amount of feed air. For example, when the amount of a gas used for regeneration is 45% and the amount of feed air is 100%, the amount of a product is equal to or less than a value which is obtained by subtracting 45%, which is the amount of a gas required for regeneration, from 100%, which is the amount of feed air. That is, the amount of a product is 55% or less.

Accordingly, as the case stands, current performances of pre-purification limit a total increase of a production performance of a cryogenic air separation method.

In recent years, due to the increase of distillation performances achieved by the process improvement in a cryogenic air separation method, an increase of a yield of a product gas obtained by separation is expected. However, it is still necessary to use a large amount of a purge gas in pre-purification, and therefore a constant amount of a waste gas generated in a distillation step is required for pre-purification. Accordingly, there is a problem in that a sufficient product yield which corresponds to the improved distillation performances cannot be achieved.

In addition, a method has been disclosed in the invention described in Japanese Unexamined Patent Application, First Publication No. 60-139311, in which raw air (air which includes water and carbon dioxide to some extent) is used as a purge gas. In the invention, it is reported that "ambient air (raw air) is supplied singly or in combination with a nitrogen gas to a part of, or all parts of, a beating and temperature-rising step as a regeneration gas for an absorbent". Furthermore, in FIG. 3 showing Example thereof, it is shown that a regeneration gas (purge gas) is supplied from the end of a purified gas outlet of an adsorption column.

However, a high-performance carbon dioxide adsorbent, which has been used in recent years, has a carbon dioxide adsorbing ability which remarkably deteriorates when the adsorbent adsorbs moisture. Accordingly, it has been believed that such a method, wherein raw air which includes water and carbon dioxide to some extent is used as a part of, or all of, a purge gas as disclosed in Japanese Unexamined Patent Application, First Publication No. 60-139311, cannot be adopted in a case wherein a high-performance carbon dioxide adsorbent is used.

PRIOR ART DOCUMENTS

Patent Documents

Patent document 1: Japanese Patent No. 3416391
Patent document 2: Japanese Unexamined Patent Application, First Publication No. 60-139311

DISCLOSURE OF INVENTION

Problem to be Solved by the Invention

The purpose of the present invention is to increase a product yield by decreasing the amount of a purge gas, which is required for regenerating absorbents when pre-purification of feed air is performed according to the TSA method in the cryogenic air separation method, that is, by reducing the usage of a waste gas which is generated from a cryogenic air separation apparatus and is used as a purge gas.

Means for Solving the Problem

The inventors of the present invention have intensively studied about regeneration of adsorbents used in a conventional method. As a result, they found that a heating value required for desorbing moisture is about 70%, with respect to the total heating value required for regeneration (evaluation is performed at air pressure of 600 kPa (A) and a air temperature of 40° C.). Furthermore, it was also found that the heating value is about 80%, when sensible heat of activated alumina used for adsorbing moisture is taken into consideration.

In this way, it was found that since a large heating value is used for desorbing moisture, that is, since a large amount of a purge gas is used for desorbing moisture, it is necessary to improve a regenerating method of a moisture adsorbent in feed air purification in order to decrease a regeneration gas ratio.

The present invention which is achieved based on the aforementioned knowledge is as follows;
a pre-purification method of feed air for cryogenic air separation; wherein
feed air is purified in succession with plural adsorption columns, and an adsorption step and a regenerating step are performed alternatively for the columns by switching the steps so that at least one of the columns is constantly treated in the adsorption step, the method including the following steps (a) to (e):

(a) an adsorption step wherein a compressed feed air is supplied in an adsorption column, wherein a layer of a moisture adsorbent which adsorbs water included in feed air and a layer of a carbon dioxide adsorbent which adsorbs carbon dioxide included in feed air are filled in this order from the side where the feed air is introduced in the column, to remove at least water and carbon dioxide from the feed air;

(b) a decompression step wherein pressure in the adsorption column is reduced to atmospheric pressure after the adsorption step is terminated;

(c) a heating step wherein the moisture adsorbent and the carbon dioxide adsorbent of the adsorption column, wherein the interior thereof has decompressed to atmospheric pressure, are heated and regenerated;

(d) a cooling step wherein the moisture adsorbent and the carbon dioxide adsorbent are cooled at a temperature, wherein an adsorption operation is performable, by introducing a purge gas which does not comprise water and carbon dioxide and is not heated; and (e) a pressurization step wherein the moisture adsorbent and the carbon dioxide adsorbent are pressurized by purified air; wherein the heating step (c) includes a total heating step and a partial heating step which are performed in parallel, wherein the total heating step is a step wherein a heated purge gas, which does not comprise water and carbon dioxide, is supplied to the discharge side of purified air of the adsorption column to heat the moisture adsorbent and the carbon dioxide adsorbent, and the partial heating step is a step wherein heated raw air is supplied between the layer of the moisture adsorbent and the layer of the carbon dioxide adsorbent to heat the moisture adsorbent.

It is preferable that a temperature of the raw air which is supplied to perform the partial heating step in the step (c) be 60 to 250° C.

It is preferable that a temperature of the purge gas which is supplied to perform the total heating step in the step (c) be 100 to 250° C.

It is preferable that the amount of raw air supplied for the partial heating step in the step (C) be 5 to 15% with respect to the amount of air which is treated in a pre-purification unit.

The purification method of feed air of the present invention can be used for pre-purification of feed air which is supplied in a cryogenic air separation method.

Effects of the Invention

According to the present invention, it is possible to reduce an amount of a purge gas which is used for regenerating an adsorbent when pre-purification of feed air is performed by the TSA method in cryogenic air separation. Therefore, it is possible to increase a product yield. Furthermore, the present invention is excellent in reproducing ability of an adsorbent. Therefore, it is possible to sufficiently perform adsorption and regeneration even if air introduced in a column has not been cooled by a freon refrigerating machine or the like, and the present invention does not damage the environment.

BRIEF DESCRIPTION OF THE DRAWINGS

FIG. 1 shows a schematic structural FIGURE which shows an example of a purifier which performs a purification method of the present invention.

BEST MODE FOR CARRYING OUT THE INVENTION

While preferred embodiments of the invention are described and illustrated below, it should be understood that these are exemplary of the invention and are not to be considered as limiting. Additions, omissions, substitutions and other modifications can be made without departing from the scope of the present invention.

The present invention is characterized in that a partial heating step, wherein heated raw air is supplied to a moisture adsorbent layer, and a total heating step, wherein a heated waste gas which does not comprise impurities is supplied to a carbon dioxide adsorbent layer as a purge gas, are performed in combination in the heating step wherein thermal-regeneration is performed.

Here, heated raw air in the partial heating step is merely supplied to a portion where a moisture adsorbent has been filled.

Furthermore, while the moisture adsorbent is regenerated in the partial heating step, a heated waste gas which does not include impurities is supplied as a purge gas to a portion to which a carbon dioxide adsorbent has been filled. Accordingly, the total heating step, wherein the carbon dioxide adsorbent is regenerated, and the partial heating step can be performed simultaneously. In the steps, the carbon dioxide adsorbent is heated merely by the heated purge gas. The moisture adsorbent is heated by raw air, a purge gas, or a mixture of raw air and a purge gas.

While the partial heating step is performed for a moisture adsorbent, a carbon dioxide adsorbent can be heated simultaneously. In the present invention, it is possible to use a waste gas, which is generated in succession in a distillation step in cryogenic air separation, without wasting the waste gas and delaying heating of a carbon dioxide adsorbent. Furthermore, it is possible to regenerate an adsorbent effectively.

In the present invention, raw air used in the partial heating step can be selected optionally, and may be a gas which is partially supplied from a low pressure portion of feed air compressor. It is also possible to separately prepare an air blower or the like for partial heating.

The partial heating is performed by supplying heated raw air to the boundary between a moisture adsorbent and a carbon dioxide adsorbent. Since there is a possibility that moisture included in air deteriorates adsorbing ability of a carbon dioxide adsorbent, it is preferable that raw air used for the heating step do not contact with a carbon dioxide adsorbent. Accordingly, raw air can be supplied from the position which is the interior of the moisture adsorbent layer, or from the position which is the interior of the moisture adsorbent layer and is close to the boundary of the adsorbent layers. Otherwise, while the generally required amount of a moisture adsorbent is maintained, the additional amount of a moisture adsorbent may be added at the position which exists somewhat near the carbon dioxide layer apart from the boundary of the adsorbents, in order to protect a carbon dioxide adsorbent. Furthermore, these methods may be used in combination.

Furthermore, a purge gas which does not include impurities and is used for the total heating step is supplied to the end of a purified gas outlet of a carbon dioxide adsorbent layer.

Any pressure is acceptable for raw air used in a partial heating step, in so far as the pressure is sufficient to flow the raw air in a moisture adsorbent layer.

Pressure of a purge gas which does not comprise impurities and is used in the total heating step can be determined as follows. A purge gas is supplied to a carbon dioxide adsorbent layer, and on the other hand, heating (partial heating) of a moisture adsorbent layer, which exists at the downstream side of a flow of the gas which is used for regeneration, is performed using raw air. Accordingly, pressure of a purge gas used for the total heating step is determined such that pressure loss of a carbon dioxide adsorbent layer is added to a pressure of air used for partial heating, and a pressure loss caused by pipes and the like is further added thereto. In the heating step for the thermal-regeneration of the adsorbent, a supply temperature of raw air, which is used for partial heating of a part at which a moisture adsorbent has been filled, is preferably 60 to 250° C., and more preferably 80 to 100° C. It is most effective to lead and use a part of air which exists in a low pressure portion in a feed air compressor as raw air which is heated for performing a partial heating step. Such a method enables the use of compression heat effectively which is generated when feed air is compressed. Here, high temperature is preferable when the amount of raw air is small, and low temperature can be used when the amount of raw air is large.

When thermal regeneration of the adsorbent is performed in the heating step, it is preferable that a supply temperature of a purge gas which does not comprise impurities and is used to perform a total heating step be 100 to 250° C., and more preferably 130 to 210° C. When the temperature is 100° C. or less, regeneration occurs insufficiently, and when the temperature is 250° C. or more, a capacity of a heater used for heating becomes too large and becomes a factor which increases cost.

When thermal regeneration of the adsorbent is performed in the heating step, it is preferable that a supply amount of raw air which is used for performing a partial heating of a portion, where a moisture adsorbent has been filled, be 5 to 15% with respect to the amount of feed air which is treated in the pre-purification. When the supply amount is less than this amount, the effect of heating raw air cannot be obtained. When the supply amount exceeds this amount, discharge volume of a feed air compressor is influenced.

The purification method of the present invention is explained concretely while referring to FIG. 1.

Feed air via a line 1 is compressed by an air compressor 2 to the predetermined pressure (500 to 800 kPa (A)), and is cooled at about 40° C. by an after-cooler 3. Subsequently, condensed water is separated from the cooled and compressed air with a drain separator (not shown), and then the air enters a pre-purification apparatus while being saturated with moisture at the temperature at which the air is cooled. In the present invention, the temperature of compressed air which enters a pre-purification apparatus can be optionally selected.

The pre-purification apparatus is equipped with two adsorption columns 5a and 5b, and an absorbing step and a regenerating step are performed for the columns so that the steps are changed alternatively. Accordingly, in the apparatus, either of the columns is always treated by the adsorbing step, and it is possible to purify feed air continuously. While an adsorbing step (a) is performed in the adsorption column 5a, a regenerating step which includes steps (b) to (e) is performed in the adsorption column 5b. The number of adsorption columns can be changed if necessary.

Each step is explained only for the adsorption column 5a in the following explanation, and explanation for the adsorption column 5b is omitted since similar steps are performed between the columns alternatively. The explanation for equipment used for the adsorption column 5b is also omitted, since the equipment is represented by the same numbers and terms as for the adsorption column 5a except that "b" is further added thereto.

In an adsorption column 5a, a moisture adsorbent 20a such as an active alumina, silica-gel, K-A type zeolite, Na-A type zeolite or the like is filled at the inlet side of the column, wherein feed air is introduced to the inlet side, and a carbon dioxide adsorbent 21a such as a Na—X type zeolite is filled at the outlet side of the column, wherein purified air is exhausted from the outlet side. The adsorbent layers are separated from each other by a portion so that a small space is provided between the layers. A line 26a is provided at said space to introduce raw air, which is heated to perform partial heating.

(Adsorption Step)

In an adsorption step, feed air is introduced into an adsorption column 5a by opening a valve 4a, and feed air is introduced in an adsorption column 5b by opening a valve 4b. When the adsorption column 5a is used in the adsorption step, moisture is removed by a moisture adsorbent 20a from the feed air which is introduced from the valve 4a, and subsequently, carbon dioxide and small amount of other impurities of the feed air are removed by a carbon dioxide adsorbent 21a.

Air purified by the column is then introduced to a so-called cold box 8, which includes a distillation column to perform cryogenic distillation of air, from the valve 6 via a line 7. Each content of moisture and carbon dioxide included in the purified air from the pre-purification unit is 1 ppm or less and 0.1 ppm or less in general.

(Decompression Step)

After the adsorption step for the adsorption column 5a is completed, valves 4a and 6a are closed, and a valve 9a is opened. By opening the valve 9a, a gas which has been maintained in the adsorption column 5a is exhausted to outside air via a silencer (not shown), and the pressure in the column is decompressed nearly to atmospheric pressure.

(Heating Step)

Partial Heating

After the interior of the column is decompressed until the internal part of the column becomes almost atmospheric pressure, a valve 18a is opened, and heated raw air is introduced to the adsorption column 5a from a line 25 via a line 26a. Since a valve 9a has been opened and raw air is supplied toward a moisture adsorbent 20a of the adsorption column 5a, the moisture adsorbent 20a is heated and a waste gas is exhausted from the adsorbent column and toward outside of the unit via a valve 9a. The terminal end of the line 26a is provided between a carbon dioxide adsorbent and a moisture adsorbent and may exist at the vicinity of, in contact with, or be provided in the moisture adsorbent.

Total Heating

By opening a valve 13 and valve 14a, a waste gas exhausted from the cold box 8 enters a heating equipment 12 via a line 11, and is heated to a predetermined temperature. Then, the gas passes through a valve 14a, and is introduced into an adsorption column 5a as a purge gas.

Since a heated waste gas is used as a purge gas, the carbon dioxide adsorbent 21a and the moisture adsorbent 20a are heated in this order to perform regeneration of the adsorbents, and the waste gas used for regeneration is released to outside of the unit via a valve 9a.

The heating step of the present invention is characterized such that raw air, which is supplied for the partial heating to a moisture adsorbent layer, and a purge gas (an exhaust gas from a cold box 8), which is supplied for the total heating to the outlet end of a purified gas of a carbon dioxide adsorbent 21a, meet in the middle of the adsorption column.

Here, in the present invention, it is possible to perform modification insofar as raw air and a purge gas meet at the middle of the adsorption column in the heating step, and such a modification is included in the intended range of the present invention. The modification can include a case wherein timing for a partial heating and timing for a total heating are not equal in the heating step. It is acceptable for the invention that a partial heating and a total heating start simultaneously, one of the heating steps starts earlier than the other step, a partial heating and a total heating finish simultaneously, or one of the heating steps finishes earlier than the other step. It is preferable that supplying be finished simultaneously.

(Cooling Process)

When a temperature of an adsorbent existing at the lowest part (inlet side of feed air) of a moisture adsorbent 20a increases at a predetermined temperature (90 to 130° C.) (the amount of a purge gas and the capacity of a heating equipment are determined such that a temperature increases at a predetermined time), a valve 13 is closed and a valve 15 is opened to perform a cooling step.

Due to the aforementioned operation, a purge gas is supplied to an adsorption column 5a via a valve 14a without being heated, and therefore, the adsorbent is gradually cooled. An exhaust gas is released to outside of the unit via a valve 9a.

(Pressurization Step)

After the cooling step is completed, the valves 9a, 14a and 15 are closed, and a valve 17a is opened. Then, a part of purified air which flows through line 7 is returned to the adsorption column 5a via a line 16 and is filled until the pressure in the column increases to the operation pressure which is required for the subsequent adsorption step. When the pressurization is finished, the valve 17a is closed, and valves 4a and 6a are opened again to start a new cycle which starts from a step (a).

In this way, the purification method which uses the purification device as shown in FIG. 1 is a method wherein feed air is purified continuously with adsorption columns 5a and 5b, which are used alternatively and are filled in a layered state with moisture adsorbent 20a and 20b, which adsorb moisture included in feed air, and with carbon dioxide adsorbent 21a and 21b, which adsorb carbon dioxide. Each of the adsorption columns 5a and 5b may be plural columns. The method includes an adsorption step, a decompression step, a heating step, a cooling step and a pressurization step. The heating step includes a total heating step and a partial heating step which are performed in parallel. The total heating step is a step wherein a heated purge gas which includes neither moisture nor carbon dioxide is supplied to a carbon dioxide adsorbent so that the purge gas is supplied to the side where feed air flows out from the carbon dioxide adsorbent in order to heat the carbon dioxide adsorbent and a moisture adsorbent, and the partial heating step is a step wherein heated raw air is supplied between a layer of the carbon dioxide adsorbent and a layer of the moisture adsorbent.

Concrete examples are explained below. Here, results obtained by study using dynamic simulation are shown.

Simulator of the TSA process of pre-purification comprises the following assumptions.

(1) Gas obeys ideal gas law.

(2) Concentration distribution and temperature distribution toward the radial direction of an adsorption column do not occur.

(3) A gas in each adsorbent layer flows according to a plug flow model wherein diffusion to the axial direction is merely taken into consideration.

(4) An adsorption rate follows a linear driving force (LDF) model.

(5) A composition of feed air includes four components, which consist of moisture, carbon dioxide, nitrogen and oxygen.

A base equation is derived from the aforementioned assumptions. Details of simulation used here are disclosed in "Nippon Sanso engineering report", no. 22, pages 13 to 18 (2003).

Comparative Example 1

A conventional pre-purification method was simulated under the following conditions.
Conditions of an adsorption column:
Diameter of columns: 1.4 m
Height of a filled moisture adsorbent layer: 0.808 m
Height of a filled carbon dioxide adsorbent layer: 0.655 m
Conditions of feed air: 700 kPa (A), 40° C., 5800 Nm$^3$/h Calculation was performed such that, in the conventional pre-purification method, an adsorption step and a regeneration step (decompressing, heating, cooling and pressurizing) were performed for two hours so that the steps were switched every two hours for each column of a two-column type pre-purification apparatus. In the calculation, it was presumed that a purge gas did not include moisture and carbon dioxide.

The same flow rate was supplied to both the heating step and the cooling step to regenerate both adsorbents. Calculations were performed for several conditions wherein a flow rate and a temperature of a purge gas were changed, and for each condition, conditions wherein breakthrough of moisture from a moisture adsorbent occurred and breakthrough of carbon dioxide from a carbon dioxide adsorbent occurred in the adsorption step were studied.

(Results)

By repeatedly conducting calculations, wherein a temperature of a purge gas was changed while a flow rate of a purge gas was gradually reduced, conditions were studied wherein breakthrough of moisture from a moisture adsorbent layer occurred and conditions wherein breakthrough of carbon dioxide from a carbon dioxide adsorbent layer occurred.

As a result, it was found that conditions wherein breakthrough of moisture from a moisture adsorbent layer did not occur and breakthrough of carbon dioxide from a carbon dioxide adsorbent layer did not occur were when the lower limit of a purge gas flow rate was 2610 Nm$^3$/h (a regeneration gas ratio=a flow rate of a purge gas/a flow rate of feed air=45%), when a regenerating temperature at this time was 210° C.

Under the conditions of the pre-purification unit of this study, regeneration was not performed when a purge gas flow rate was further reduced, since a sufficient temperature which was necessary to perform regeneration was not provided to a moisture adsorbent existing at the downstream side of the purge gas flow direction, even if a temperature of a purge gas was increased.

Here, in the calculations, it was found that it is possible to roughly understand that, when a temperature of an adsorbent existing at the lowest portion (inlet to which air is introduced) of a moisture adsorbent layer increases to 90 to 130° C., regeneration of an adsorbent has been completed and breakthrough of moisture and carbon dioxide does not occur.

Example 1

The method of the present invention was simulated under the conditions of adsorption columns which were similar to those of Comparative Example 1.
Conditions of an adsorption column:
Diameter of columns: 1.4 m
Height of a filled moisture adsorbent layer: 0.808 m
Height of a filled carbon dioxide adsorbent layer: 0.655 m
Conditions of feed air: 700 kPa (A), 40° C., 5800 Nm$^3$/h Calculation was performed such that an adsorption step and a regeneration step (decompressing, heating, cooling and pressurizing) were performed for two hours so that the steps were switched every two hours for each column of a two-column type pre-purification apparatus.

A purge gas was presumed a purified gas, which did not include moisture and carbon dioxide, and the same flow rate was supplied to both a heating step and a cooling step to regenerate both adsorbents.

In a heating step, a partial heating step wherein heated raw air was supplied to a moisture adsorbent layer and a total heating step wherein a heated purge gas, which did not comprise impurities, was supplied to a carbon dioxide adsorbent layer were performed in parallel.

In the present Example, a temperature and a flow rate of heated raw air were fixed at 80° C. and 580 Nm$^3$/h, and calculations were performed under conditions wherein a flow rate of a purge gas or a temperature of a purge gas in a heating step were changed. Then, conditions were studied wherein breakthrough of moisture from a moisture adsorbent and breakthrough of carbon dioxide from a carbon dioxide adsorbent occurred in the adsorption step in each condition.

(Results)

By repeatedly conducting calculations, wherein a temperature of a purge gas was changed while a flow rate of a purge gas was gradually reduced, conditions were studied wherein breakthrough of moisture from a moisture adsorbent layer occurred and wherein breakthrough of carbon dioxide from a carbon dioxide adsorbent layer occurred.

As a result, it was found that conditions wherein breakthrough of moisture from a moisture adsorbent layer did not occur and conditions wherein breakthrough of carbon dioxide from a carbon dioxide adsorbent layer did not occur were when the lower limit of a purge gas flow rate was 2030 Nm$^3$/h (a regeneration gas ratio=a flow rate of a purge gas/a flow rate of feed air=35%) when a purge gas temperature at this time was 210° C. similar to that of Comparative Example 1.

It was found that, due to the present invention, 580 Nm$^3$/h of a flow rate of a purge gas can be reduced as compared with the conventional method. Accordingly, it was found that the amount of a waste gas sent from a cryogenic air separation apparatus can be reduced due to said reduced amount, and therefore, it is possible to increase a product gas.

Comparative Example 2

Under the following conditions, which are different from that of Comparative Example 1, a conventional pre-purification method was simulated.

Conditions of an adsorption column:
Diameter of columns: 4.4 m
Height of a filled moisture adsorbent layer: 0.945 m
Height of a filled carbon dioxide adsorbent layer: 0.657 m
Conditions of feed air: 550 kPa (A), 40° C., 50000 Nm$^3$/h A conventional pre-purification method, which was different from that of Comparative Example 1, was performed under the aforementioned conditions. Calculation was performed such that an adsorption step and a regeneration step (decompressing, heating, cooling and pressurizing) were performed for two hours so that the steps were switched every two hours for each column of a two-column type pre-purification apparatus. In the calculation, it was presumed that a purge gas was a purified gas which does not include moisture and carbon dioxide, and the same flow rate was supplied to both a heating step and a cooling step to regenerate both the adsorbents.

Calculations were performed for different conditions wherein a flow rate and a temperature of a purge gas were changed, and conditions were studied wherein breakthrough of moisture from a moisture adsorbent and breakthrough of carbon dioxide from a carbon dioxide adsorbent occurred in the adsorption step.

(Results)

By gradually reducing a flow rate of a purge gas and changing a temperature of a purge gas in each flow rate, conditions wherein breakthrough of moisture from a moisture adsorbent layer occurred and conditions wherein breakthrough of carbon dioxide from a carbon dioxide adsorbent layer occurred were studied.

As a result, it was found that conditions wherein breakthrough of moisture from a moisture adsorbent layer did not occur and breakthrough of carbon dioxide from a carbon dioxide adsorbent layer did not occur were when the lower limit of a purge gas flow rate was 27000 Nm$^3$/h (a regeneration gas ratio=a flow rate of a purge gas/a flow rate of feed air=54%), when a regenerating temperature at this time was 210° C.

Under the aforementioned conditions of the pre-purification apparatus, regeneration was not performed when a purge gas flow rate was further reduced, since sufficient temperature for performing regeneration was not provided to a moisture adsorbent which existed at the downstream side of a purge gas flow direction even when a temperature of a purge gas was increased.

Example 2

The method of the present invention was simulated under conditions of adsorption columns which were similar to those of Comparative Example 2.

Conditions of an adsorption column:
Diameter of a column: 4.4 m
Height of a filled moisture adsorbent layer: 0.945 m
Height of a filled carbon dioxide adsorbent layer: 0.657 m
Conditions of feed air: 550 kPa (A), 40° C., 50000 Nm$^3$/h An adsorption step and a regeneration step (decompressing, heating, cooling and pressurizing) were performed for two hours so that the steps were switched every two hours for each column of a two-column type pre-purification apparatus. A purge gas was presumed as a purified gas which did not include moisture and carbon dioxide, and calculation was performed such that same flow rate was supplied to a heating step and a cooling step to regenerate adsorbents.

In a heating step, a partial heating step, wherein heated raw air was introduced to a portion to which a moisture adsorbent layer was filled, and a total heating step, wherein a heated purge gas which did not comprise impurities was introduced to the portion to which a carbon dioxide adsorbent layer was filled, were performed in parallel.

In the present example, a temperature and a flow rate of heated raw air were fixed to 200° C. and 5000 Nm$^3$/h, and calculations were performed for conditions where a flow rate of a purge gas or a temperature of a purge gas in a heating step were changed. States were studied wherein breakthrough of moisture and breakthrough of carbon dioxide from each adsorbent occurs in the adsorption step in each condition.

(Results)

By reducing a flow rate of a purge gas and increasing a temperature of a purge gas in each flow rate, conditions wherein breakthrough of moisture from a moisture adsorbent layer occurred and breakthrough of carbon dioxide from a carbon dioxide adsorbent layer occurred were studied.

As a result, it was found that conditions wherein breakthrough of moisture from a moisture adsorbent layer did not occur and breakthrough of carbon dioxide from a carbon dioxide adsorbent layer did not occur were when the lower limit of a purge gas flow rate was 22500 Nm$^3$/h (a regeneration gas ratio=a flow rate of a purge gas/a flow rate of feed air=45%) when a regenerating temperature at this time was 210° C. similar to that of Comparative 1.

4500 Nm³/h of a flow rate of a purge gas can be reduced due to the present invention as compared with the conventional method, and it is possible to increase of a product gas due to the reduced amount.

INDUSTRIAL APPLICABILITY

It is possible to increase a product yield by reducing a waste gas which is used as a purge gas when an adsorbent is regenerated in pre-purification of feed air in the TSA method of cryogenic air separation.

BRIEF DESCRIPTION OF THE REFERENCE SYMBOLS

1 Line
2 Air compressor
3 After-cooler
4a, 4b Valve
5a, 5b Adsorption column
7 Line
8 Cold box
20a, 20b Moisture adsorbent
21a, 21b Carbon dioxide adsorbent
12 Heating equipment
25 Line
26a, 26b Line

The invention claimed is:

1. A pre-purification method of feed air for cryogenic air separation; wherein
feed air is purified in succession with plural adsorption columns, and an adsorption step and a regenerating step are performed for the columns alternatively by switching the steps so that at least one of the columns is constantly treated in the adsorption step, the method including the following steps (a) to (e):
(a) an adsorption step wherein a compressed feed air is supplied in an adsorption column, wherein a moisture adsorbent which adsorbs water included in feed air and a carbon dioxide adsorbent which adsorbs carbon dioxide included in feed air are filled in layers in this order from the side where the feed air is introduced in the column, to remove at least water and carbon dioxide from the feed air;
(b) a decompression step wherein pressure in the adsorption column is reduced to atmospheric pressure after the adsorption step is terminated;
(c) a heating step wherein the moisture adsorbent and the carbon dioxide adsorbent in the adsorption column, which has decompressed to the atmospheric pressure, are heated and regenerated;
(d) a cooling step wherein the moisture adsorbent and the carbon dioxide adsorbent are cooled at a temperature, wherein an adsorption operation is performable, by introducing a purge gas which does not comprise water and carbon dioxide and is not heated; and
(e) a pressurization step wherein the cooled moisture adsorbent and the cooled carbon dioxide adsorbent are pressurized by purified air; wherein
the heating step (c) includes a total heating step and a partial heating step, which are performed in parallel, wherein
the total heating step is a step wherein a heated purge gas, which does not comprise water and carbon dioxide, is supplied to the discharged side of a purified air of the adsorption column to heat the moisture adsorbent and the carbon dioxide adsorbent, and
the partial heating step is a step wherein heated raw air is supplied between a layer of the moisture adsorbent and a layer of the carbon dioxide adsorbent to heat the moisture adsorbent;
and wherein a temperature of the purge gas which is supplied to perform the total heating step in the step (c) is 100 to 250° C.

2. The pre-purification method of feed air according to claim 1, wherein a temperature of the raw air which is supplied to perform the partial heating step in the step (c) is 60 to 250° C.

3. The pre-purification method of feed air according to claim 1, wherein the amount of raw air supplied to the partial heating step in the step (c) is 5 to 15% with respect to the amount of air which is treated in the pre-purification.

4. A cryogenic air separation method which includes the pre-purification method of feed air according to claim 1.

* * * * *